2,859,217
Patented Nov. 4, 1958

2,859,217
ACETYLCHOLINE ESTERASE INHIBITORS

Quentin F. Soper, Indianapolis, Ind., assignor to Eli Lilly and Company, Indianapolis, Ind., a corporation of Indiana No Drawing. Application September 28, 1956
Serial No. 612,575

5 Claims. (Cl. 260—296)

My invention relates to certain novel bis-quaternary ammonium compounds.

The compounds provided by my invention can be represented by the following formula:

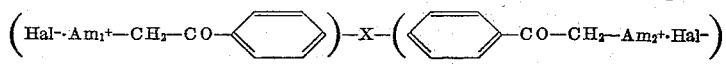

in which X is an oxygen or a sulphur atom; Hal is a halogen atom having an atomic number greater than 16, for example, chlorine, bromine or iodine; and $Am_1$ and $Am_2$ represent tertiary amines, such as tri-lower alkylamines, as for example, triethylamine, trimethylamine, tripropylamine, diethylmethylamine and dimethylpropylamine, and aromatic-type heterocyclic amines, as for example, pyridine, picoline, ethylpyridine, propylpyridine, quinoline, isoquinoline and quinaldine. In the above formula $Am_1$ and $Am_2$ can be the same or different.

The compounds provided by my invention are crystalline salts. They are quite soluble in water and are somewhat less soluble in the more polar organic solvents. They are substantially insoluble in the nonpolar organic solvents. Illustrative compounds coming within the purview of the above formula are the following:

4,4'-oxy-bis-(phenacyl-pyridinium chloride)
4,4'-thio-bis-(phenacyl-pyridinium bromide)
4,4'-oxy-bis-(phenacyl-triethylammonium iodide)
4,4'-thio-bis-(phenacyl-trimethylammonium bromide)
4,4'-oxy-bis-(phenacyl-isoquinolinium chloride)
4,4'-oxy-bis-(phenacyl-pyridinium bromide)
4,4'-thio-bis-(phenacyl-β-picolinium iodide)
4,4'-oxy-bis-(phenacyl-quinaldinium chloride)
4-(4-quinolinium acetylphenylmercapto) - phenacyl pyridinium dichloride
4-(4-triethylammonium acetylphenylmercapto)-phenacyl-α-picolinium dibromide
4,4'-oxy-bis-(phenacyl-diethylmethylammonium bromide)

The preparation of compounds represented by the above formula can be accomplished by reacting a 4,4'-oxy-bis-(phenacylhalide) or 4,4'-thio-bis-(phenacyl-halide) with a suitable tertiary amine. Symmetrically substituted compounds are prepared by using a molar excess of the tertiary amine whereas unsymmetrically substituted compounds are prepared by using less than one equivalent of two different tertiary amines in each of two successive reactions. A mono-halo, mono-quaternary ammonium salt is of necessity an intermediate in the latter method of preparation. When a symmetrical compound is to be prepared, the excess of the particular amine which is present can also be used as a solvent provided the amine is a liquid at reaction temperatures. A preferable method of preparation, however, is one employing an inert solvent such as a low molecular weight alcohol. The use of a solvent or diluent is, of course, necessary when the reacting tertiary amine is a solid or when a compound with unsymmetrical amine substituents is to be prepared. In carrying out the reaction, the reaction mixture is simply heated, usually at the reflux temperature of the system, until the reaction is substantially complete.

Ordinarily, if a particular halide ion is desired in the final bis-quaternary ammonium compound, the preparation of the compound is carried out with the specific halide initially present in the bis-(phenacyl-halide) reactant. However, if for some reason this method of preparation is not desirable, it is possible to interchange the halide ions in the final bis-quaternary ammonium compound by methods well known to the art. For example, a bis-quaternary ammonium bromide can be reacted with silver chloride to yield the less soluble silver bromide and the bis-quaternary ammonium chloride. Other methods such as the use of ion exchange resins and simple metathetic processes can be employed.

The method of halide interchange can be used also to prepare the bis-(phenacyl-halide) starting material. For example, 4,4'-oxy-bis-(phenacyl-chloride) and excess sodium iodide reacted together in acetone solution give, 4,4'-oxy-bis-(phenacyl-iodide).

The compounds provided by this invention are useful pharmaceutical agents. They find particular use as inhibitors of acetylcholine esterase and as such, their chief application lies in the treatment of the congenital disorder known as Myasthenia gravis. The compounds, being orally active, are most conveniently administered therapeutically as capsules or tablets. However, because of their solubility, they can also be administered orally as solutions in water or as elixirs in alcohol and water. In preparing capsules, the dose of the therapeutically active compound, for example, 50, 100 or 200 mgs. of 4,4'-oxy-bis-(phenacyl-pyridinium chloride), is mixed with a solid pharmaceutical extending medium such as starch and the mixture is then filled into an empty capsule. However, cross scored tablets, which can be broken into two or four sections, are the preferred mode of administration of one of my novel compounds since the dosage level must be tailor-made to suit the needs of the individual Myasthenia gravis patient. Such tablets are prepared as follows using 4,4'-oxy-bis-(phenacyl-pyridinium chloride) as exemplary of one of my active compounds: 240 g. of 4,4'-oxy-bis-(phenacyl-pyridinium chloride), 120 g. of starch and 2 g. of magnesium stearate are granulated and then compressed into tablets such that each tablet contains 200 mg. of the active compound. Other fillers or binders can, of course, be used in place of the starch and magnesium stearate specified above.

This invention is further illustrated by the following specific examples:

EXAMPLE 1

*Preparation of 4,4'-oxy-bis-(phenacyl-pyridinium chloride)*

A reaction mixture was prepared containing 72 g. of 4,4'-oxy-bis-(phenacyl chloride), 50.5 ml. of pyridine, 2 ml. of 12 N hydrochloric acid and 2250 ml. of 95 percent ethanol. The mixture was heated to refluxing temperature for about 2 days, thus forming 4,4'-oxy-bis-(phenacyl-pyridinium chloride). The volume of solution was decreased to about 1500 ml. by evaporation of the reaction mixture in vacuo. Sufficient anhydrous diethyl ether was then added to bring the volume of solution up to about 3 l. whereupon the 4,4'-oxy-bis-(phenacyl-pyridinium chloride) precipitated from solution. The precipitated material was collected by filtration, and was recrystallized twice from 95 percent ethanol after a decolorization with activated charcoal. Seventy-three and two-tenths grams of purified 4,4'-oxy-bis-(phenacyl-pyridinium chloride) melting at about 169° C. were obtained. The compound analysed for a trihydrate as follows.

*Analysis.*—Calc'd (after drying): Cl=14.70. Found: Cl=14.45. Wt. loss on drying=9.78. Theoretical wt. loss for three molecules of water=10.09.

EXAMPLE 2

*Preparation of 4,4'-thio-bis-(phenacyl-pyridinium chloride)*

A mixture of 10 g. of 4,4'-thio-bis-(phenacyl chloride) and 75 ml. of pyridine were refluxed for about 16 hrs., thus forming 4,4'-thio-bis-(phenacyl-pyridinium chloride). The compound was isolated by treating the reaction mixture with acetone, and separating the resulting solid by filtration. The filter cake was purified by several recrystallizations from an acetone-ethanol solvent mixture. 4,4'-thio-bis-(phenacyl-pyridinium chloride) melted at about 163° C. with some early softening.

EXAMPLE 3

*Preparation of 4,4'-thio-bis-(phenacyl-trimethylammonium chloride)*

A reaction similar to that of Example 2 was carried out except that a solution of trimethylamine in acetone was used in place of pyridine. 4,4'-thio-bis-(phenacyl-trimethylammonium chloride) thus formed, was purified by threefold recrystallization from a solvent mixture containing diethyl ether and 95 percent ethanol followed by a recrystallization from a solvent mixture containing methanol and ethyl acetate. 4,4'-thio-bis-(phenacyl-trimethylammonium chloride) did not melt even when heated above 320° C.

EXAMPLE 4

*Preparation of 4,4'-oxy-bis-(phenacyl-trimethylammonium chloride)*

A preparation similar to that of Example 3 was carried out using 4,4'-oxy-bis-(phenacyl chloride) in place of the corresponding thio compound. 4,4'-oxy-bis-(phenacyl-trimethylammonium chloride) prepared and isolated by the above procedure, was purified by one recrystallization from 95 percent ethanol followed by two recrystallizations from a methanol-ethyl acetate solvent mixture. The compound did not melt even when heated to above about 380° C.

*Analysis.* — Calc'd: C=59.86; H=6.85. Found: C=60.04; H=7.54.

EXAMPLE 5

*Preparation of 4,4'-oxy-bis-(phenacyl-α-picolinium chloride)*

A reaction was carried out following the procedure of Example 2 but employing α-picoline in place of pyridine and 4,4'-oxy-bis-(phenacyl chloride) in place of 4,4'-thio-bis-(phenacyl chloride). 4,4'-oxy-bis-(phenacyl-α-picolinium chloride) prepared in this way melted at about 250–252° C. after being recrystallized three times from a mixture of 95 percent ethanol and ether. Similar reactions were carried out using β-picoline, γ-picoline, and quinoline in place of α-picoline to give 4,4'-oxy-bis-(phenacyl-β-picolinium chloride), 4,4'-oxy-bis-(phenacyl-γ-picolinium chloride), and 4,4'-oxy-bis-(phenacyl-quinolinium chloride), respectively.

EXAMPLE 6

*Preparation of 4,4'-thio-bis-(phenacyl chloride)*

One mol of diphenyl sulfide was dissolved in 1 l. of carbon disulfide in which had been suspended 275 g. of anhydrous aluminum chloride. To this stirred mixture was added 339 g. of chloracetylchloride. After the addition had been completed, the reaction mixture was stirred for one-half hour further to insure more nearly complete formation of of 4,4'-thio-bis-(phenacyl chloride) and was then poured over 2 kg. of ice to decompose organoaluminium complexes and free the desired reaction product. The resulting mixture was filtered. The filtrate separated into a water layer and an organic layer containing the 4,4'-thio-bis-(phenacyl chloride). The organic layer was separated, and evaporated to dryness in vacuo. The resulting residue comprising crystalline 4,4'-thio-bis-(phenacyl chloride), was twice decolorized with activated charcoal and was then recrystallized from anhydrous ethanol. 4,4'-thio-bis-(phenacyl chloride) thus obtained melted at about 105–106° C.

*Analysis.* — Calc'd: C=56.65; H=3.57. Found: C=56.45; H=3.46.

EXAMPLE 7

*Preparation of 4-(4-chloroacetylphenoxy)-phenacyl-pyridinium chloride*

A solution was prepared containing 0.1 mol. of 4,4'-oxy-bis-(phenacyl chloride), 250 ml. of benzene and 250 ml. of acetone. This solution was stirred and was heated to refluxing temperature during the addition of 0.075 mol of pyridine dissolved in 100 ml. of benzene. The stirring and refluxing were continued for about 16 hours after the addition of the pyridine had been completed in order to give a maximum yield of 4-(4-chloroacetylphenoxy)-phenacyl-pyridinium chloride. Upon cooling the reaction mixture, crystals of 4-(4-chloroacetylphenoxy)-phenacylpyridinium chloride precipitated. These were collected by filtration. Recrystallization of the filtered materials from anhydrous ethanol yielded crystals of 4-(4-chloroacetylphenoxy)-phenacyl-pyridinium chloride melting with decomposition at about 198–199° C.

*Analysis.*—Calc'd: C=62.70; H=4.20; N=3.48. Found: C=62.49; H=4.25; N=3.21.

Other half-quaternary ammonium salt half-halide compounds can be prepared by using other tertiary amines such as α-picoline, quinoline, trimethylamine and the like in place of pyridine in the above example, and by using the appropriate 4,4'-oxy-bis-(phenacyl halide).

EXAMPLE 8

*Preparation of 4-(γ-picolinium acetylphenoxy)-phenacyl-pyridinium dichloride*

Following the procedure of Example 7, 4-(4-chloroacetyl-phenoxy)-phenacylpyridinium chloride was reacted with a solution of γ-picoline and alcohol to yield 4-(4-γ-picolinium acetylphenoxy)-phenacylpyridinium dichloride. This compound melted at about 179–180° C. with decomposition after recrystallization from an alcohol-ether solvent mixture.

*Analysis.*—Calc'd: N=5.66. Found: N=5.41.

EXAMPLE 9

*Preparation of 4,4'-oxy-bis-phenacyl quaternary ammonium bromides or iodides*

Following the method of Example 1 but employing 4,4'-oxy-bis-(phenacyl bromide) in place of 4,4'-oxy-bis-(phenacyl chloride), 4,4'-oxy-bis-(phenacyl pyridinium bromide) can be prepared. The corresponding thio compound can be prepared by using the 4,4'-thio-bis-(phenacyl bromide). Other tertiary amines can be used in place of pyridine to yield different bis phenacyl quaternary ammonium bromides. The corresponding iodides can also be prepared by the same method, using the appropriate phenacyl iodide as a starting material.

I claim:
1. 4,4'-oxy-bis-(phenacyl-pyridinium chloride).
2. 4,4'-thio-bis-(phenacyl-pyridinium chloride).
3. 4,4'-oxy-bis-(phenacyl-trimethylammonium chloride).
4. 4,4'-oxy-bis-(phenacyl-α-picolinium chloride).
5. 4-(4-γ-picolinium acetylphenoxy)-phenacyl pyridinium dichloride.

References Cited in the file of this patent

Bahner et al.: J. Am. Chem. Soc., vol. 75, pages 1472–3 (1953).